Figure 1:
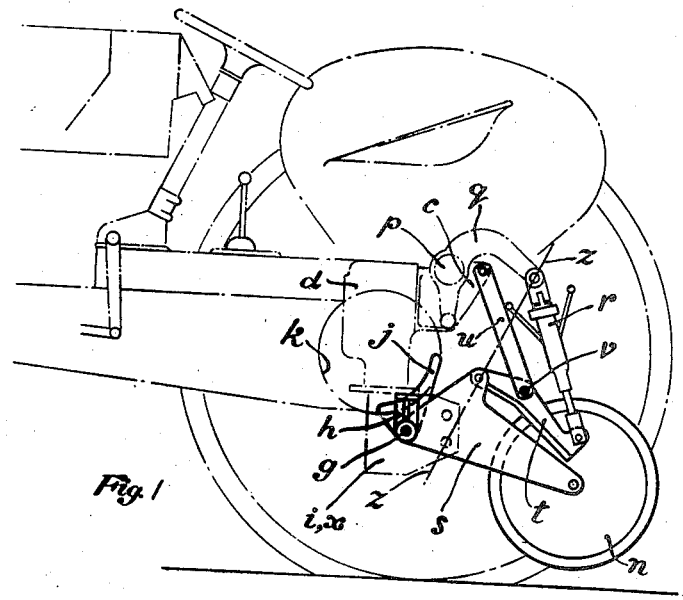

April 8, 1958

C. H. HULL 2,829,906

AUXILIARY WHEEL TO ELEVATE VEHICLE DRIVE WHEEL

Filed Aug. 27, 1956

Inventor
Charles H. Hull

By
Attorneys

# United States Patent Office 2,829,906
Patented Apr. 8, 1958

2,829,906
AUXILIARY WHEEL TO ELEVATE VEHICLE DRIVE WHEEL

Charles Hartley Hull, Newsome, Huddersfield, England

Application August 27, 1956, Serial No. 606,243

2 Claims. (Cl. 280—150)

The invention relates to jacking mechanism for tractors of the kind provided with power-operated implement-lifting means including a rock-shaft extending transversely across the rear of the tractor and actuated at the will of the tractor driver by a hydraulic ram, and more particularly to mechanism for jacking up one or more of the driving wheels of such a tractor.

The principal object of the invention is to permit a tractor of the kind referred to, and provided with differential means between the driving wheels and with power-take-off means, for driving external machinery, of the "non-live" type hereinafter defined, to be brought to rest without also cutting off the drive to the external machinery. For instance, when "non-live" power-take-off means of a tractor are being used to drive the moving parts of a combine harvester drawn by the tractor, and the harvester shows signs of becoming clogged, it is possible with the present invention for the driver to jack up one or more of the tractor driving wheels which will then rotate idly, forward motion of the tractor thus being arrested without disengaging the usual transmission clutch and without arresting the drive to the harvester mechanism, whereupon the congestion of the latter will quickly be cleared. The term "non-live" is intended to denote power-take-off means driven from some part of the tractor transmission mechanism the drive to which from the tractor engine is capable of being disconnected by the usual transmission clutch. The present invention provides a simple attachment whereby a tractor having "non-live" power-take-off means as above defined can operate as though it were equipped with built-in "live" power-take-off means which are independent of the transmission clutch.

A further object of the invention is to permit a tractor of the kind referred to, and provided with differential means between the driving wheels, to be propelled at an extremely low speed.

Another object of the invention is, of course, to permit a tractor, of the kind referred to, to be jacked up while stationary to permit removal of a wheel or wheels.

In a tractor having only its rear wheels driven, either an arrangement for jacking up one of said wheels or an arrangement for jacking up both of said wheels may be employed, whilst in a four-wheel-drive vehicle it may be necessary to jack up both near-side or both off-side wheels, and the possibility exists of jacking up the whole vehicle if desired.

The invention is characterized in that mechanism, for jacking up one or more of the driving wheels of a tractor of the kind referred to, comprises an arm so connected at its forward end to the tractor frame as to be movable pivotally towards and away from the ground, and provided at its rearward end with a ground-engaging member; a lever pivotally connected at its front end to a suitable point on said arm; a strut pivotally connected at its lower end to a point intermediate the ends of said lever and at its upper end to the tractor frame; a link pivotally connecting the rear end of said lever to an arm fast on the tractor rock-shaft; and spring means adapted to urge the first-mentioned arm away from the ground. The first-mentioned arm may be forked at its rearward end, or may comprise two parallel plate members, a freely rotatable wheel being journalled within the fork or between the plate members; or the rear end of the said arm may be formed as a skid.

The arm referred to as being fast on the rock-shaft will conveniently be one of the usual lift arms, and the spring means referred to will preferably be a tension spring anchored at its upper end to the other of the usual lift arms and at its lower end to the tractor frame. The link referred to will preferably be adjustable in length.

The accompanying drawings show a preferred embodiment of the invention, employing a wheel and capable of jacking up one only of the driving wheels of a tractor of which the rear axle only is driven.

Figure 2:
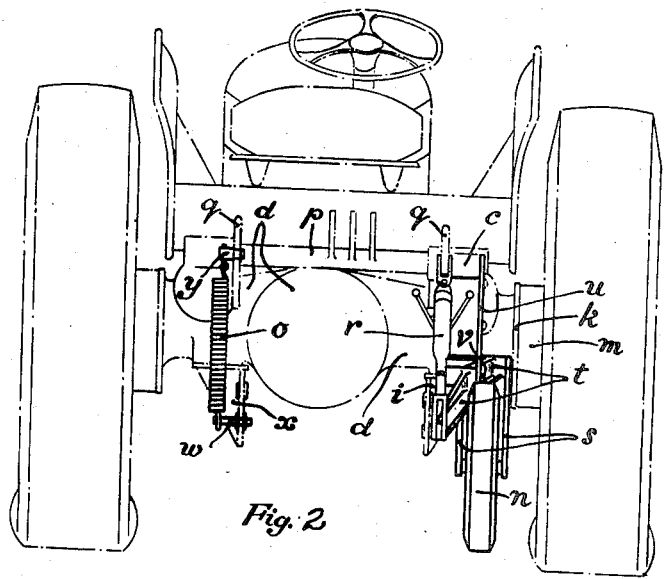

Fig. 1 is a side elevation of the mechanism, the tractor mounting same being drawn in broken lines and with the near-side driving wheel removed for the sake of clarity; and Fig. 2 is a rear elevation thereof.

Referring now to the drawings, a tractor to which the mechanism is attached includes power-operated implement-lifting means of well-known type wherein the ram of a built-in single-acting hydraulic cylinder (not shown) an example of which is disclosed in U. S. Patent No. 2,118,180 dated May 24, 1938, which is adapted, at the will of the tractor driver, to actuate a rock shaft $p$ extending transversely across the rear of the tractor, two laterally-spaced lift arms $q$ fast on the said rock-shaft being normally effective to raise or lower the two laterally-spaced lower links of a so-called tractor three-link hitch by means of respective lift rods $r$ at least one of which is adjustable in length. The front ends of a pair of plate members $s$ are pivotally mounted on a pin $g$ supported by a bracket member $h$ secured to the usual off-beat lower hitch bracket $i$ and by a bracket $j$ adapted to be secured by set-screws to a flange $k$ on the off-side end of the rear axle casing $d$, a wheel $n$ being rotatably supported between the rear ends of said plate members. Also pivotally connected between the plate members $s$, at a suitable distance from the pin $g$, is the front end of a rearwardly-extending lever $t$, the rear end of which is connected to the off-side arm $q$ by one of the usual lift rods $r$ which is adjustable in length. A strut $u$ is pivotally connected at one end to a bracket $c$ fast with the tractor rear axle casing $d$ and at the other end to the lever $t$ at a point $v$ intermediate its ends, and upon admitting pressure oil to a built-in hydraulic cylinder such as shown in the patent hereinbefore referred to, the resultant pull exerted by the lift rod $r$ rocks the lever $t$ about the point $v$ and thus moves the plate members $s$ pivotally downwards about the pin $g$ to force the wheel $n$ into contact with the ground and jack up the off-side driving wheel of the tractor. As shown in Fig. 2, a tension spring $o$, for returning the jacking mechanism to its raised, inoperative position when the pressure in the hydraulic cylinder is released, extends between a pin $w$ secured to the usual near-side lower hitch bracket $x$ and a pin $y$ secured to the near-side arm $q$. For the sake of clarity only the centre-line $z$ of the spring $o$ is shown in Fig. 1.

If the length of the levelling lever $r$ is suitably adjusted, a so-called "creeper gear" effect can be obtained, for propelling the tractor at an extremely low speed when performing such operations as hedge-trimming with a tractor-driven cutter-bar, by lowering the jacking mechanism to such a position that sufficient slipping or spinning of the driving wheel concerned will occur to slow down appropriately the forward motion of the tractor. This operation can only be carried out on relatively soft land, however, in view of the tyre wear which would otherwise result.

Whilst the embodiment hereinbefore particularly described and illustrated is only capable of jacking up one of the tractor driving wheels, this being the simplest and most convenient method of carrying the invention into effect, it will of course be understood that mechanism for jacking up some or all of the driving wheels whilst the tractor is in motion is within the scope of the invention.

What I claim is:

1. Mechanism for jacking up at least one of the driving wheels of a tractor having a rock-shaft, comprising an arm connected at its forward end to the tractor frame for movement pivotally towards and away from the ground and provided at its rearward end with a ground-engaging member; a lever pivotally connected at its front end to a suitable point on said arm; a strut pivotally connected at its lower end to a point intermediate the ends of said lever and at its upper end to the tractor frame; an arm fixed to the tractor rock-shaft; a link pivotally connecting the rear end of said lever to the arm fixed on the tractor rock-shaft; and spring means reacting against the tractor frame for urging the first-mentioned arm away from the ground.

2. Mechanism for jacking up at least one of the driving wheels of a tractor having a rock-shaft, comprising an arm connected at its forward end to the tractor frame for movement pivotally towards and away from the ground and provided at its rear end with a ground-engaging member; a lever pivotally connected at its front end to a suitable point on said arm; a strut pivotally connected at its lower end to a point intermediate the ends of said lever and at its upper end to the tractor frame; an arm fixed to the tractor rock-shaft; a link adjustable in length and pivotally connecting the rear end of said lever to the arm fixed on the tractor rock-shaft; and spring means reacting against the tractor frame acting to urge the first-mentioned arm away from the ground.

References Cited in the file of this patent

UNITED STATES PATENTS

| | | |
|---|---|---|
| 1,256,527 | De Marco | Feb. 19, 1918 |
| 1,486,133 | Elliot et al. | Mar. 11, 1924 |
| 1,661,641 | Vecchi | Mar. 6, 1928 |
| 2,681,709 | Miller | June 22, 1954 |